United States Patent [19]

Waltrip

[11] 4,214,046
[45] Jul. 22, 1980

[54] METHOD OF EXTRACTING A LIQUID ELECTROLYTE AND OTHER PRODUCTS FROM COAL

[75] Inventor: Owen R. Waltrip, Roseville, Calif.

[73] Assignee: Nuclear Supreme, Casper, Wyo.

[21] Appl. No.: 12,561

[22] Filed: Feb. 15, 1979

[51] Int. Cl.² ............... H01M 6/04; H01M 10/08
[52] U.S. Cl. .................................... 429/198; 423/460; 208/8 LE; 208/8 R
[58] Field of Search ............... 429/198, 200, 203, 188; 423/460; 44/1 F; 208/8 R, 8 LE

[56] References Cited

U.S. PATENT DOCUMENTS

| 2,055,836 | 9/1936 | Cowles | 23/271 |
| 2,838,429 | 6/1958 | Sanders | 429/198 |
| 3,856,507 | 12/1974 | Brug et al. | 75/0.5 A |

*Primary Examiner*—Donald L. Walton
*Attorney, Agent, or Firm*—Clarence A. O'Brien; Harvey B. Jacobson

[57] ABSTRACT

Coal converted to coke and ground into particulate form, is mixed with an aqua regia solution resulting in a slurry from which solid matter settles out and volatiles are withdrawn. The pH value of the aqua regia solution is so modified by dilution to control reactions within the slurry resulting in a liquid phase that is suitable as a battery electrolyte.

15 Claims, 1 Drawing Figure

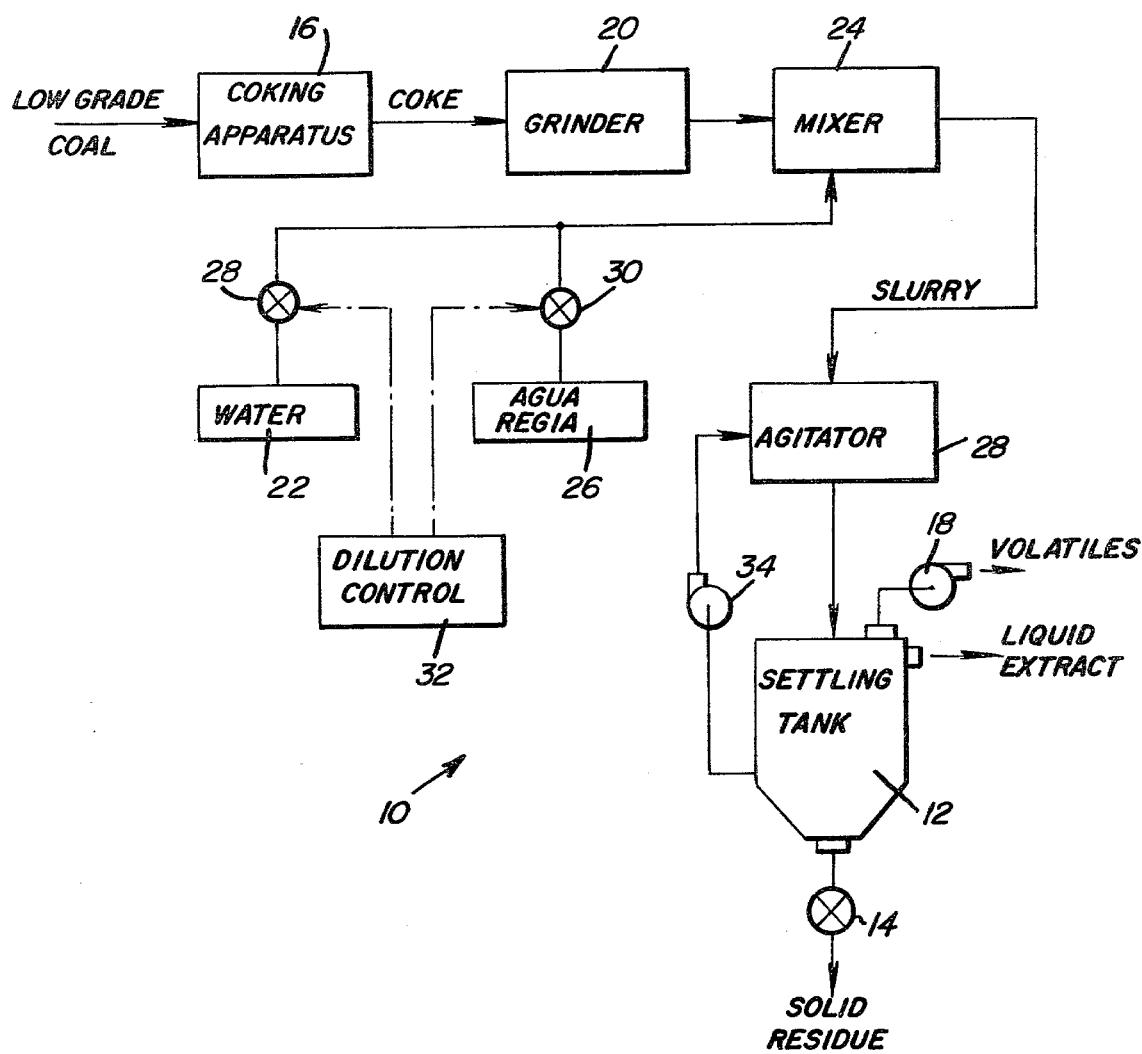

METHOD OF EXTRACTING A LIQUID ELECTROLYTE AND OTHER PRODUCTS FROM COAL

BACKGROUND OF THE INVENTION

This invention relates in general to the conversion of carbonaceous material containing metallic components into useful products such as a battery electrolyte.

Because of its relatively low heat content and atmospheric polluting effect as a solid fuel, low grade coals have not been fully exploited. More recently, however, greater interest has been generated in utilizing low grade coals as a substitute source of processed fuels and for non-fuel products. The use of lignite coal, for example, as a liquid extract source for battery electrolyte, is disclosed in U.S. Pat. No. 2,838,429 to Sanders. According to the Sanders patent, ground lignite coal is reached with nitric acid and a dried residue reaction product chemically oxidized to produce an acidic liquid suitable as an electrolyte for storage batteries. Treatment with other chemicals in several different steps in addition to treatment with nitric acid was required according to the Sanders patent in order to obtain a suitable liquid extract.

The use of nitric acid as an ingredient of aqua regia to dissolve metallic compounds in ores and other metal-bearing materials is also well known. The oxidizing power of the nitric acid and its effect on reactions that occur when material being treated is dissolved in the aqua regia, is also well known. This oxidizing power is precisely controlled by modifying the pH value of the aqua regia solution according to U.S. Pat. No. 3,865,507, to Brug et al, so as to regulate the reaction inhibiting effect of the nitric acid and enable precipitation of a solid product by the addition of reducing agents. Such use of aqua regia is, however, restricted to the recovery of metallic gold as disclosed in the Brug et al patent.

The use of low grade coal having metallic component impurities presents a special problem in producing a liquid extract because the presence of such impurities in the extract is detrimental to its use as a battery electrolyte. It is therefore an important object of the present invention to provide a relatively simple and inexpensive method of treating carbonaceous material to produce a liquid extract free of metallic components. Additional objects of the invention include the recovery of useful solid residues containing metallic components in greater concentration and gaseous products.

SUMMARY OF THE INVENTION

In accordance with the present invention, a carbonaceous material containing a high percentage of free carbon, a substantial amount of ash as well as trace amounts of metallic components in the form of metals and metal compounds, is mixed with an aqua regia solution diluted by a controlled amount to regulate the pH value of the acid solution and the oxidizing power of the nitric acid therein so as to produce a liquid phase in the resulting reaction mixture or slurry, suitable as a battery electrolyte.

The liquid phase of the slurry produced by mixing of the carbonaceous material with the diluted aqua regia solution, is separated by settling out of a solid residue having an increased concentration of the metallic components, and withdrawal of volatiles resulting from reaction occurring in the slurry. The carbonaceous material is obtained by coking a low grade coal and grinding the coke into particles of a size suitable to form a slurry with the water and the aqua regia solution.

These, together with other objects and advantages which will become subsequently apparent, reside in the details of construction and operation as more fully hereinafter described and claimed, reference being had to the accompanying drawing forming a part hereof.

BRIEF DESCRIPTION OF THE DRAWING

The drawing is a schematic block diagram illustrating an arrangement of apparatus for carrying out the method of the present invention.

DETAILED DESCRIPTION OF SPECIFIC EMBODIMENT

Referring now to the drawing in detail, a system generally denoted by reference numeral 10 is shown for processing a low grade coal as the raw material in order to produce, solid, liquid and gaseous products. The liquid product is shown as being withdrawn from a settling tank 12 free of metallic components. The metallic components exist in a higher concentration in a solid residue recovered from the tank through gate valve 14 than in the raw material fed to a conventional coking apparatus 16. The gaseous product is withdrawn from the tank 12 by a pump 18.

A solid carbonaceous material in the form of coke is supplied from the coking apparatus 16 to a grinder 20 within which the coke is reduced to particle size suitable to form a slurry with water supplied from water source 22 to a mixer 24. It is well known that coke has a high free carbon content, a substantial amount of ash and sometimes trace amounts of metallic components. The coke slurry is mixed in the mixer with aqua regia from source 26. The relative quantities of water and aqua regia supplied to the mixer 24 is controlled through valves 28 and 30 by a dilution control component 32.

A slurry consisting of the particulate coke and diluted aqua regia solution is fed from the mixer to an agitator 28 within which various physical and chemical reactions occur as a result of the intimate contact produced between the particulate ingredients of the slurry and the dissolving and oxidizing powers of the diluted aqua regia. These reactions continue within the settling tank 12 from which a liquid phase is recycled back to the agitator by pump 34 in one embodiment of the invention. The separation between the liquid, gaseous and solid phases occurs within tank 12 as a result of settling. Arrangements of agitator and settling tank as diagrammed herein are well known as disclosed, for example, in U.S. Pat. No. 2,055,836 to Cowles.

An important achievement of the present invention is the transfer of the metallic components in the raw material being processed to the solid residue so that the liquid extract produced is suitable as a battery electrolyte. This is achieved by the aforementioned action of the aqua regia in dissolving metallic components such as gold. Further, it is an important discovery of the present invention that the oxidizing power of the nitric acid in the aqua regia is instrumental in effecting the appropriate reactions with the carbonaceous material of the coal after the coal undergoes a coking operation, provided such carbonaceous material is reduced to particle size and the aqua regia is diluted by a controlled amount.

According to one specific example, the method of the present invention was practiced by use of coke produced from lignite coal containing trace amounts of gold or gold compounds. The coke was ground to particle size and mixed with water to form a slurry. Diluted aqua regia was added to the slurry. The aqua regia which consists of 2 to 3 volumes of concentrated hydrochloric acid to 1 volume of concentrated nitric acid, was diluted so as to form a slurry mixture having a water to acid volumetric ratio of 12:1. The slurry was mixed and settled for a sufficient length of time, dependent on the quantity of coke being processed, until a sizable accumulation of a solid residue occured. The liquid phase was then withdrawn and found suitable as a liquid electrolyte in a conventional storage battery.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A method of producing a liquid extract, substantially free of metallic components, from a carbonaceous material containing trace amounts of the metallic components, including the steps of: reducing the carbonaceous material to particle size; mixing the particles of carbonaceous material with an acid having metal dissolving and oxidizing powers; diluting the acid before said mixing to regulate said dissolving and oxidizing powers resulting in formation of a mixture having a solid phase within which the metallic components are confined; and settling the mixture to separate a liquid phase from the solid phase as the liquid extract.

2. The method of claim 1 wherein said acid is aqua regia.

3. The method of claim 2 wherein said carbonaceous material is coke.

4. The method of claim 3 wherein the acid is diluted to form a water to acid ratio of 12:1.

5. The method of claim 1 wherein the acid is diluted to form a water to acid ratio of 12:1.

6. The method of claim 5 wherein said acid is aqua regia.

7. The method of claim 5 wherein said carbonaceous material is coke.

8. The method of claim 1 wherein said carbonaceous material is coke.

9. A method of producing a liquid electrolyte, comprising the step of: coking coal to form coke; grinding the coke into particle size; mixing the particles of coke with a diluted solution of aqua regia to form a slurry; and settling the slurry to withdraw a liquid phase therefrom constituting said liquid electrolyte.

10. The method of claim 1 wherein said diluted solution of aqua regia has a water to acid ratio of 12:1.

11. A method of producing a liquid extract from a low grade coal containing carbon and metallic components, comprising the steps of: coking the coal to form coke; reducing the coke to particle size; mixing the particles of coke with aqua regia to form a mixture; diluting the aqua regia before said mixing resulting in a liquid phase substantially free of said metallic components; and separating the liquid phase from the mixture to form said liquid extract.

12. The method of claim 11 wherein said aqua regia is diluted to form an acid solution having a water to acid ratio of 12:1.

13. The method claim 12 wherein said metallic components include gold concentrated in a solid phase of the mixture.

14. A method of producing an electrolytic liquid from a carbonaceous material having metallic components therein, including the steps of: physically reducing the carbonaceous material to a particulate solid; mixing the particulate solid with an acid having metal dissolving and oxidizing actions on said carbonaceous material; diluting the acid before said mixing with the particulate solid to regulate the dissolving and oxidizing actions thereof resulting in formation of a slurry having a solid phase within which the metallic components are confined; and separating the solid phase from the slurry to recover a liquid phase constituting said electrolytic liquid.

15. The method of claim 14 wherein said diluted acid is a 12:1 solution of water to aqua regia.